(12) United States Patent
Cho et al.

(10) Patent No.: US 8,890,829 B2
(45) Date of Patent: Nov. 18, 2014

(54) DIGITIZER

(71) Applicant: Samsung Electro-Mechanics Co., Ltd., Gyunggi-do (KR)

(72) Inventors: Ho Yun Cho, Gyunggi-do (KR); Hee Bum Lee, Gyunggi-do (KR); Kyoung Soo Chae, Gyunggi-do (KR); Dong Sik Yoo, Gyunggi-do (KR); Yun Ki Hong, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 105 days.

(21) Appl. No.: 13/659,662

(22) Filed: Oct. 24, 2012

(65) Prior Publication Data
US 2014/0055404 A1 Feb. 27, 2014

(30) Foreign Application Priority Data
Aug. 21, 2012 (KR) ................ 10-2012-0091267

(51) Int. Cl.
*G06F 3/041* (2006.01)
*G06F 3/046* (2006.01)
*G06F 3/0354* (2013.01)

(52) U.S. Cl.
CPC ............ *G06F 3/046* (2013.01); *G06F 3/03545* (2013.01)
USPC ........................................................ 345/173

(58) Field of Classification Search
None
See application file for complete search history.

(56) References Cited

U.S. PATENT DOCUMENTS

| | | | | |
|---|---|---|---|---|
| 4,697,244 A | * | 9/1987 | Murakami et al. | 345/173 |
| 5,120,907 A | * | 6/1992 | Shinbori et al. | 178/18.07 |
| 5,214,427 A | * | 5/1993 | Yano | 341/20 |
| 7,423,629 B2 | * | 9/2008 | Oda et al. | 345/156 |
| 7,812,268 B2 | * | 10/2010 | Ely | 178/18.03 |
| 7,875,814 B2 | * | 1/2011 | Chen et al. | 178/18.07 |
| 8,674,967 B2 | * | 3/2014 | Fukushima et al. | 345/179 |

FOREIGN PATENT DOCUMENTS

JP WO2010023861 A1 3/2010

\* cited by examiner

*Primary Examiner* — Jason Olson
(74) *Attorney, Agent, or Firm* — Ladas & Parry, LLP

(57) ABSTRACT

Disclosed herein is a digitizer including: a driving coil supplied with current to induce a magnetic line of force; a sensing coil disposed so as to intersect the driving coil to flow induced current in one direction by the magnetic line of force; and a control unit sensing variation of voltage induced to the sensing coil to calculate coordinates of the input unit when the voltage is changed due to an approach of an input unit.

9 Claims, 5 Drawing Sheets

DIGITIZER

CROSS REFERENCE TO RELATED APPLICATION

This application claims the benefit of Korean Patent Application No. 10-2012-0091267, filed on Aug. 21, 2012, entitled "Digitizer", which is hereby incorporated by reference in its entirety into this application.

BACKGROUND OF THE INVENTION

1. Technical Field

The present invention relates to a digitizer.

2. Description of the Related Art

In accordance with the growth of computers using a digital technology, devices assisting computers have also been developed, and personal computers, portable transmitters and other personal information processors execute processing of text and graphics using a variety of input devices such as a keyboard and a mouse.

While the rapid advancement of an information-oriented society has widened the use of computers more and more, it is difficult to efficiently operate products using only a keyboard and a mouse currently serving as an input device. Therefore, the necessity for a device that is simple, has minimum malfunction, and is capable of easily inputting information has increased.

In addition, current techniques for input devices have progressed toward techniques related to high reliability, durability, innovation, designing and processing beyond the level of satisfying general functions. To this end, an electromagnetic induction type digitizer has been developed as an input device capable of inputting information such as text, graphics, or the like.

An example of an input device capable of performing a function similar to the electromagnetic induction type digitizer may include a capacitive type touch screen. However, the capacitive type touch screen cannot accurately sense coordinates and cannot also recognize writing pressure, as compared to the electromagnetic induction type digitizer. Therefore, the electromagnetic induction type digitizer has better precision or accuracy than the capacitive type touch screen.

However, like the digitizer described in the follow prior art document, the digitizer according to the prior art makes a direction of a magnetic line of force different along a length direction applied to a sensing coil along a length direction of the sensing coil due to current applied to a driving coil. In other words, the sensing coil is divided into an area that faces the driving coil and an area that does not face the driving coil while intersecting the driving coil. In this case, a direction of the magnetic line of force applied to the area that faces the driving coil and a direction of the magnetic line of force applied to the area that does not face the driving coil are opposite to each other.

As a result, the digitizer according to the prior art causes a phenomenon in that current induced to the sensing coil is offset around the coil to which the magnetic line of force is applied in directions opposite to each other.

In the digitizer structure, in order to precisely detect touched coordinates of an input unit such as an electronic pen, and the like, voltage induced to the sensing coil does not need to have a sufficient value.

However, the digitizer according to the prior art does not induce sufficient voltage to the sensing coil due to the forgoing offset phenomenon.

PRIOR ART DOCUMENT

Patent Document (Patent Document 1) WO 2010/023861 A1

SUMMARY OF THE INVENTION

The present invention has been made in an effort to provide a digitizer that does not cause an offset phenomenon of induced current by forming current from a sensing coil in one direction along a line forming the sensing coil.

According to a preferred embodiment of the present invention, there is provided a digitizer including: a driving coil supplied with current to induce a magnetic line of force; a sensing coil disposed so as to intersect the driving coil to flow induced current in one direction by the magnetic line of force; and a control unit sensing variation of voltage induced to the sensing coil to calculate coordinates of the input unit when the voltage is changed due to an approach of an input unit.

The sensing coil may include a first line disposed in one direction within an area facing an inner area of the driving coil, a second line spaced apart from the first line so as to be disposed in the other direction within the area facing the inner area of the driving coil, a third line disposed in one direction within an area facing an outer area of the driving coil, and a fourth line spaced apart from the third line so as to be disposed in the other direction within an area facing an outer area of the driving coil, and the first line and the third line may be connected to each other by a first connection line and the second line and the fourth line may be connected by a second connection line.

The first connection line and the second connection line may intersect each other and may be insulated from each other by an insulating part interposed therebetween.

Current supplied to the driving coil by the control unit may be alternating current.

The driving coil and the sensing coil may vertically intersect each other.

The driving coil may be disposed in plural so as to be parallel with each other based on a first axis direction, and the sensing coil may be disposed in plural so as to be parallel with each other based on a second axis direction vertical to the first axis direction.

The control unit may sequentially supply current to the plurality of driving coils along the second axis direction and may sequentially induce the magnetic line of force to the plurality of driving coils along the second axis direction.

The control unit may measure the voltage sequentially induced to the plurality of sensing coils along the first axis direction.

The control unit may set the voltage induced to the sensing coil as a reference value before the voltage induced to the sensing coil is changed by the input unit, and compare the voltage with the reference value to sense the variation of voltage induced to the sensing coil when the voltage induced to the sensing coil is changed by the input unit.

The digitizer may further include: an insulating layer interposed between the driving coil and the sensing coil so as to insulate the driving coil and the sensing coil from each other.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
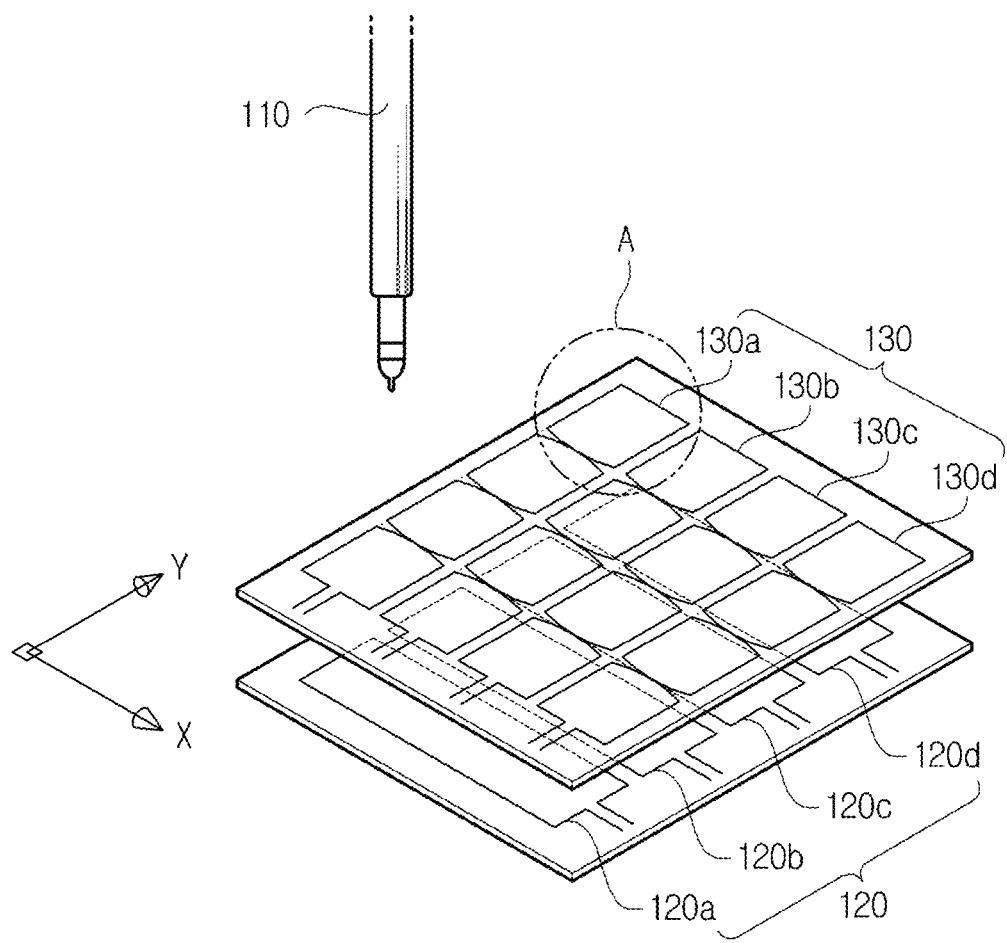
FIG. 1 is a diagram showing a digitizer according to a preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

Figure 2:
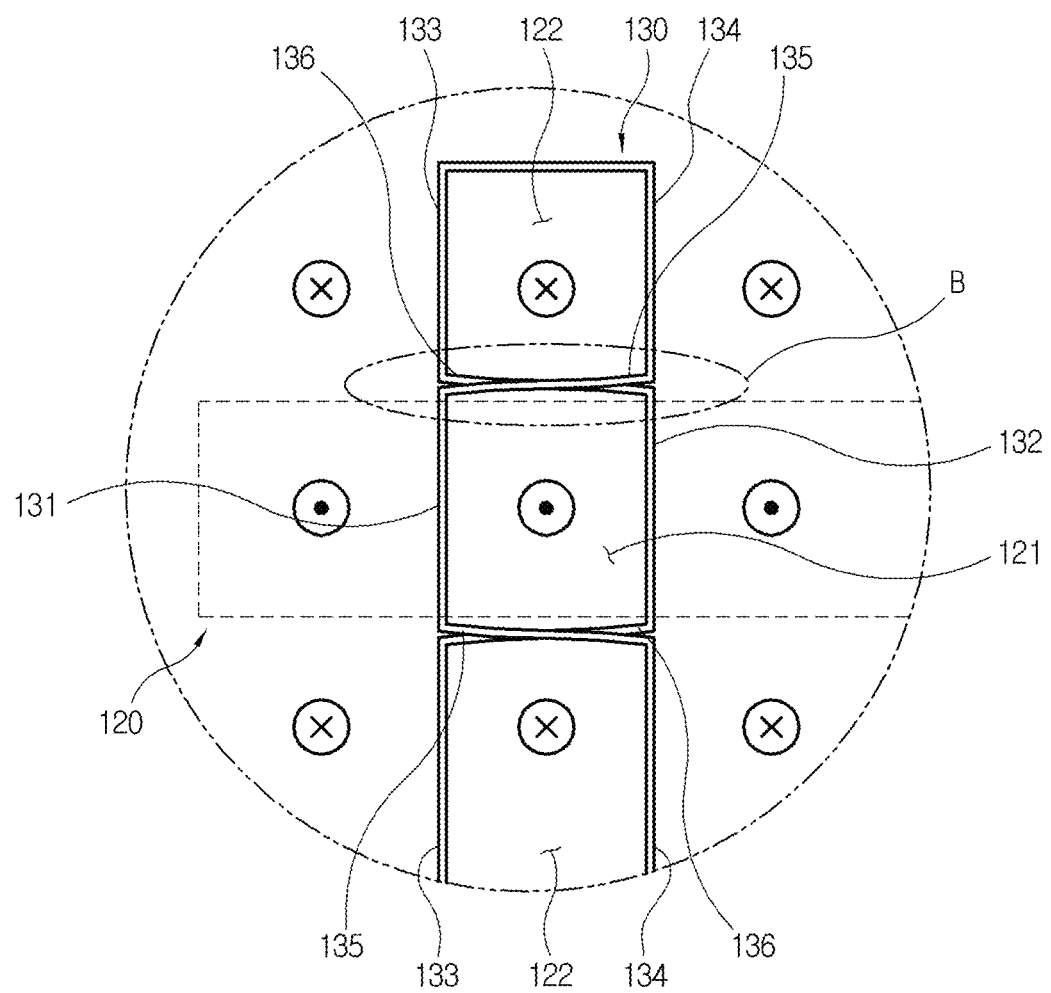
FIG. 2 is an enlarged view of area A shown in FIG. 1.
Figure 3:
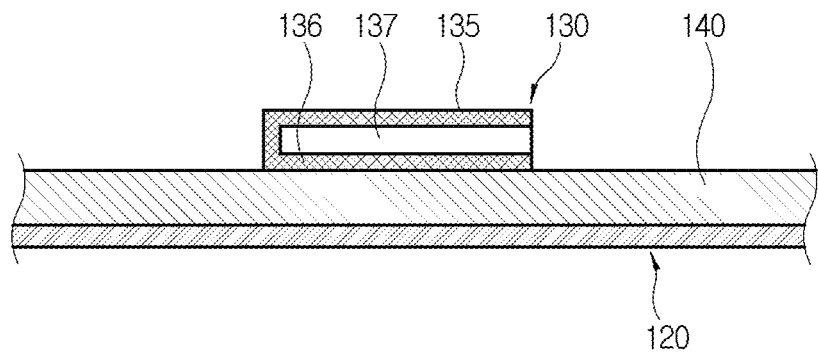
FIG. 3 is a cross-sectional view of area B shown in FIG. 2.

FIG. 1 is a diagram showing a digitizer according to a preferred embodiment of the present invention, FIG. 2 is an enlarged view of area A shown in FIG. 1, and FIG. 3 is a cross-sectional view of area B shown in FIG. 2.

The digitizer according to the preferred embodiment of the present invention includes a driving coil 120 to which a magnetic line of force is induced due to current flowing therein, a sensing coil 130 disposed to intersect the driving coil 120 and having induced current flow in one direction by the magnetic line of force, and a control unit (not shown) sensing variation of voltage to calculate coordinates of the input unit 110, when the voltage induced to the sensing coil 130 due to the approach of an input unit 110 is changed.

The input unit 110 may be, for example, a stylus pen and serves to indicate coordinates. The input unit 110 may have a resonance circuit therein and change the voltage induced to the sensing coil 130 to be described below due to the magnetic line of force radiated from the resonance circuit.

The driving coil 120 serves to supply the magnetic line of force to the sensing coil 130. In detail, the driving coil 120 may have a closed curve form and may be supplied from the control unit to induce the magnetic line of force in a direction of the sensing coil 130 when current flows in the driving coil. The magnetic line of force induced from the driving coil 120 serves to induce voltage to the sensing coil 130 and the voltage induced to the sensing coil 130 is in proportion to variation to time of the magnetic line of force induced from the driving coil 120. Therefore, in order to induce voltage to the sensing coil 130, the magnetic line of force induced from the driving coil 120 needs to be periodically changed. Therefore, the driving coil 120 may be supplied with alternating current (AC) from the control unit so as to periodically change the induced magnetic line of force.

The sensing coil 130 serves to allow the control unit to calculate coordinates based on the induced voltage. In detail, the sensing coil 130 induces voltage by the magnetic line of force generated from the driving coil 120. In this case, when the input unit 110 approaches the sensing coil 130, the voltage induced to the sensing coil 130 is changed. The control unit can confirm the variation of voltage to sense the coordinates of the input unit 110.

As shown in FIGS. 1 and 2, the driving coil 120 and the sensing coil 130 may be disposed to intersect each other. In this case, the sensing coil 130 is formed to flow the current induced by the magnetic line of force in one direction over the length of the coil forming the sensing coil 130.

In detail, as shown in FIG. 2, the sensing coil 130 may be configured to include a first line 131 disposed in one direction, that is, a left direction in a shown example within an area facing an inner area 121 (hereinafter, referred to as a 'first area') of the driving coil 120 having a closed curve form, a second line 132 disposed in the other direction, that is, a right direction in the shown example within the area facing the first area 121, a third line 133 disposed in one direction within an area facing an outer area (hereinafter, referred to as a 'second area') of the driving coil 120, and a fourth line 134 disposed in the other direction within an area facing the second area 122.

In this configuration, the first line 131 and the second line 132 are disposed so as to be spaced apart from each other within the area facing the first area 121 and the third line 133 and the fourth line 134 are similarly disposed so as to be spaced apart from each other.

In this case, the first line 131 and the third line 133 may be generally disposed on the same line. Further, the second line 132 and the fourth line 134 may be generally disposed on the same line. However, the first line 131 is not connected to the third line 133 disposed on the same line, but is connected to the fourth line 134. Further, the second line 132 is not connected to the fourth line 134, but is connected to the third line 133. In this case, the first line 131 and the fourth line 134 are connected to each other by a first connection line 135 and the second line 132 and the third line 133 are connected to each other by a second connection line 136.

That is, the sensing line 130 has a form in which the first line 131 disposed in the area facing the first area 121 succeeds the third line 133 disposed in the area facing the second area 122 and the second line 132 disposed in the area facing the first area 121 succeeds the fourth line 134 disposed in the area facing the second area 122. In this case, the first connection line 135 and the second connection line 136 intersect each other so that the sensing coil 130 has the foregoing form. In this case, as shown in FIG. 3, an insulating part 137 may be interposed between the first connection line 135 and the second connection line 136 so that the first connection line 135 and the second connection line 136 are electrically insulated from each other.

The sensing coil 130 is formed as described above so that the directions of the current induced from the first line 131 and the fourth line 134 connected to each other and the second line 132 and the third line 133 connected to each other coincide with one direction even though the directions of the magnetic lines of force applied to the area facing the first area 121 and the area facing the second area 122 face each other as shown in FIG. 2. Therefore, the sensing coil 130 flows the induced current in one direction over the length of the coil forming the sensing coil 130 and when being viewed over the length direction of the sensing coil 130, the offset phenomenon of the induced voltage does not occur like the digitizer structure according to the prior art.

As a result, in the digitizer according to the preferred embodiment of the present invention, when AC power having a predetermined frequency is applied to the driving coil 120, a magnitude in voltage to the sensing coil 130 is larger, which can be appreciated through experimental data shown in the following Table (Table 1).

TABLE 1

<Experimental data comparing magnitude in voltage induced to sensing coil 130>

| No. | Frequency of AC power [kHz] | Decibel [dB] |
|---|---|---|
| 1 | 500,000000 | −81.447529 |
| 2 | 500,000000 | −42.007519 |

The above Table 1 shows what difference the ratio (dB) of voltage induced to the sensing coil shows, when the AC power of the same frequency (500 [kHz]) is applied to the digitizer structure according to the prior art, that is, the digitizer structure (No. 1) in which the sensing coil and the driving coil are disposed to be simply orthogonal to each other and the digitizer structure according to the preferred embodiment, that is, as described above, the digitizer structure (No. 2) in which the first line 131 is connected to the third line 133 and the second line 132 is connected to the fourth line 134.

As can be appreciated from the above Table 1, it can be appreciated that the digitizer structure (No. 2) according to the preferred embodiment has a decibel value about twice as larger as the digitizer structure (No. 1) according to the prior art. The reason is that the offset phenomenon of the induced current does not occur or is remarkably reduced, in the digitizer structure according to the present embodiment.

Meanwhile, as shown in FIG. 3, the digitizer according to the present embodiment may further include the insulating layer 140 interposed between the driving coil 120 and the sensing coil 130 so as to be insulated between the driving coil 120 and the sensing coil 130.

The driving coil 120 and the sensing coil 130 may be formed to vertically intersect each other so as to calculate XY coordinates. Further, the driving coil 120 may be disposed in plural so as to be parallel with each other based on a first axis direction (X-axis direction) and the sensing coil 130 may also be disposed in plural so as to be parallel with each other based on a second axis direction (Y-axis direction) vertical to the first axis direction (X-axis direction).

FIG. 1 shows an example of the digitizer in which four driving coils 120 are disposed so as to be parallel with each other based on the first axis direction (X-axis direction) and four sensing coils 130 are disposed so as to be parallel with each other based on the second axis direction (Y-axis direction). However, the configuration is only an example for convenience of explanation and therefore, the scope of the present invention is not limited thereto.

In addition, FIG. 1 shows the example in which the plurality of driving coils 120 and sensing coils 130 are spaced apart from each other so as not overlap each other, but the present embodiment is not limited to the disposition form. The plurality of driving coils 120 may be disposed in the form in which the adjacent driving coils 120 partially overlap each other while the insulating layer is interposed between each driving coil 120. This is similarly applied to the sensing coil 130.

An example of the operating process of the digitizer configured as described above will be described with reference to the accompanying drawings. FIGS. 4 to 8 are diagrams showing an operating process of a digitizer shown in FIG. 1.

As described above, when the driving coil 120 and the sensing coil 130 are provided in plural, the control unit may supply current to the driving coil 120 through time division and measure the induced voltage to the sensing coil 130.

For example, the control unit may supply current in an order of first driving coil 120a→second driving coil 120b→third driving coil 120c→fourth driving coil 120d→along the second axis direction (Y-axis direction) to induce the magnetic line of force in an order of first driving coil 120a→second driving coil 120b→third driving coil 120c→fourth driving coil 120d and may measure the voltage induced in an order of first sensing coil 130a→second sensing coil 130b→third sensing coil 130c→fourth sensing coil 130d along the first axis direction (X-axis direction).

Figure 4:
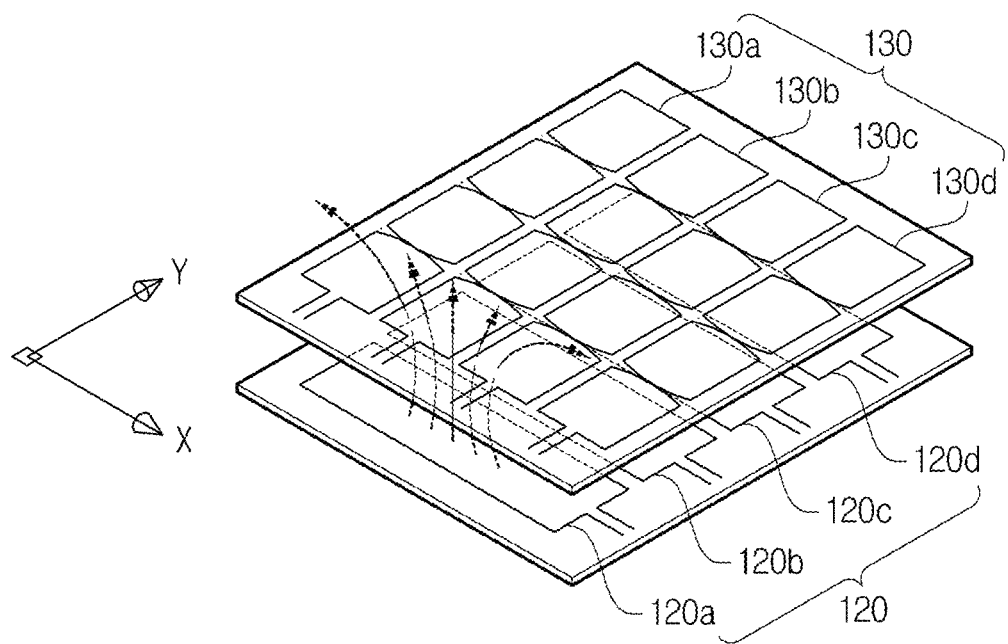
FIGS. 4 to 8 are diagrams showing an operating process of a digitizer shown in FIG. 1.

In detail, the control unit supplies current to the first driving coil 120a that is first disposed in the second axis direction (Y-axis direction) among four driving coils 120 to induce the magnetic line of force to the first driving coil 120a (see FIG. 4).

Voltage is induced to the four sensing coils 130 by the magnetic line of force. The sensing coil 130 is not affected by the input unit 110 and therefore, the voltage induced to the four sensing coils 130 is constant. In this case, the control unit sequentially measures the voltage induced to the four sensing coils 130 along the first axis direction (X-axis direction) to set the induced voltage as a first reference value. That is, the control unit measures the voltage induced in an order of first sensing coil 130a→second sensing coil 130b→third sensing coil 130c→fourth sensing coil 130d to set the voltage induced to the four sensing coils 130 as the first reference value.

Figure 5:
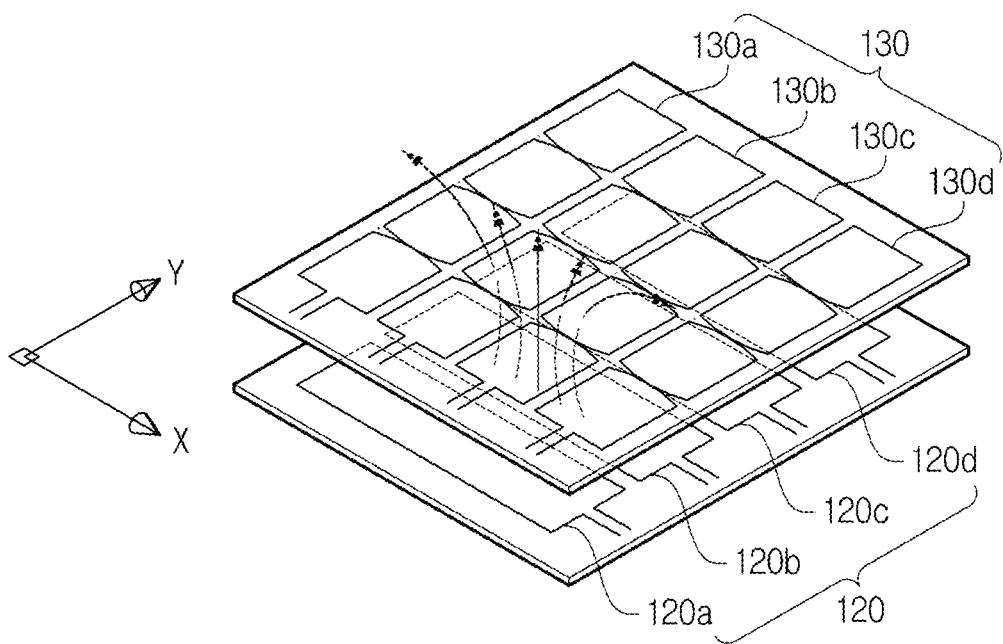

Next, as shown in FIG. 5, the control unit supplies current to the second driving coil 120b to induce the magnetic line of force to the second driving coil 120b. In this case, the control unit measures the voltage induced in an order of first sensing coil 130a→second sensing coil 130b→third sensing coil 130c→fourth sensing coil 130d to set the voltage induced to the four sensing coils 130 as a second reference value.

Figure 6:
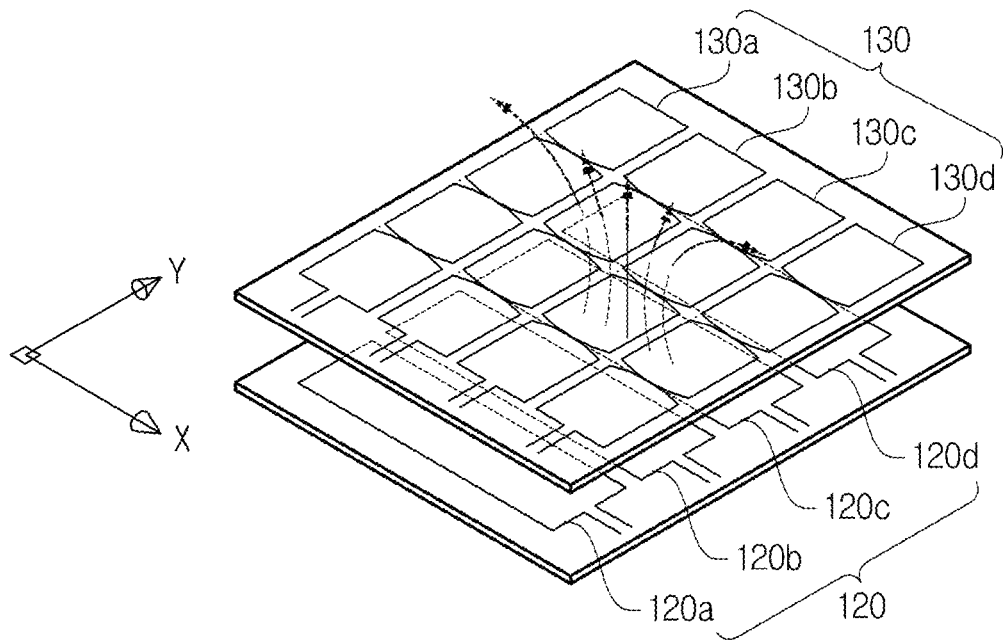

Next, as shown in FIG. 6, the control unit supplies current to the third driving coil 120c to induce the magnetic line of force to the third driving coil 120c. In this case, the control unit measures the voltage induced in an order of first sensing coil 130a→second sensing coil 130b→third sensing coil 130c→fourth sensing coil 130d to set the voltage induced to the four sensing coils 130 as a third reference value.

Figure 7:
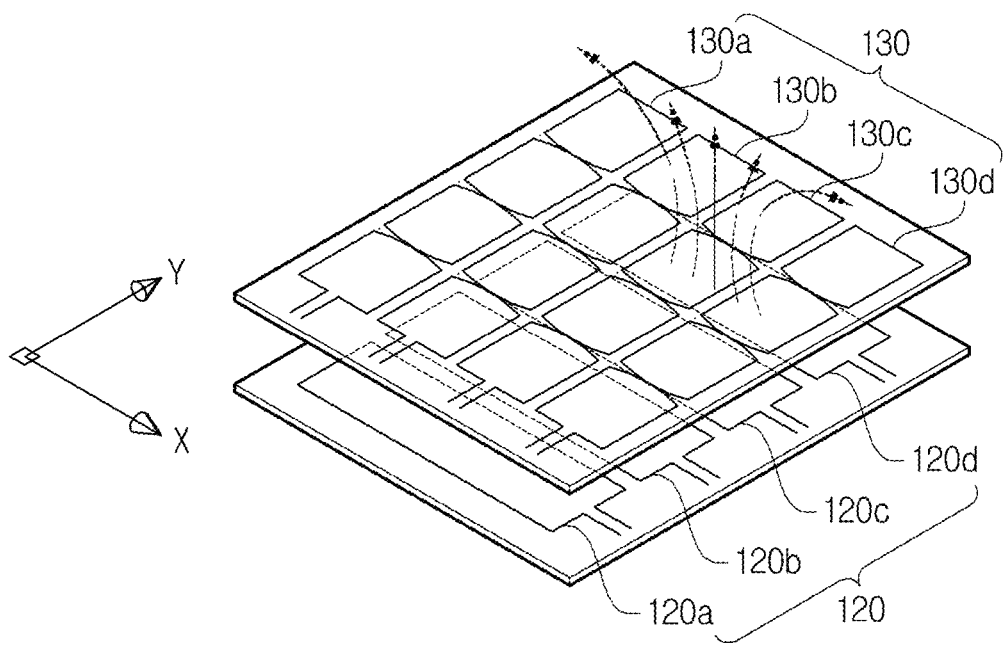

Next, as shown in FIG. 7, the control unit supplies current to the fourth driving coil 120d to induce the magnetic line of force to the fourth driving coil 120d. In this case, the control unit measures the voltage induced in an order of first sensing coil 130a→second sensing coil 130b→third sensing coil 130c→fourth sensing coil 130d to set the voltage induced to the four sensing coils 130 as a fourth reference value.

As described above, the control unit supplies current in an order of first driving coil 120a→second driving coil 120b→third driving coil 120c→fourth driving coil 120d to set the voltage induced to each sensing coil 130 as a reference value and then, as described below, again supplies current in an order of first driving coil 120a→second driving coil 120b→third driving coil 120c→fourth driving coil 120d to calculate coordinates based on the voltage induced to each sensing coil 130.

Figure 8:
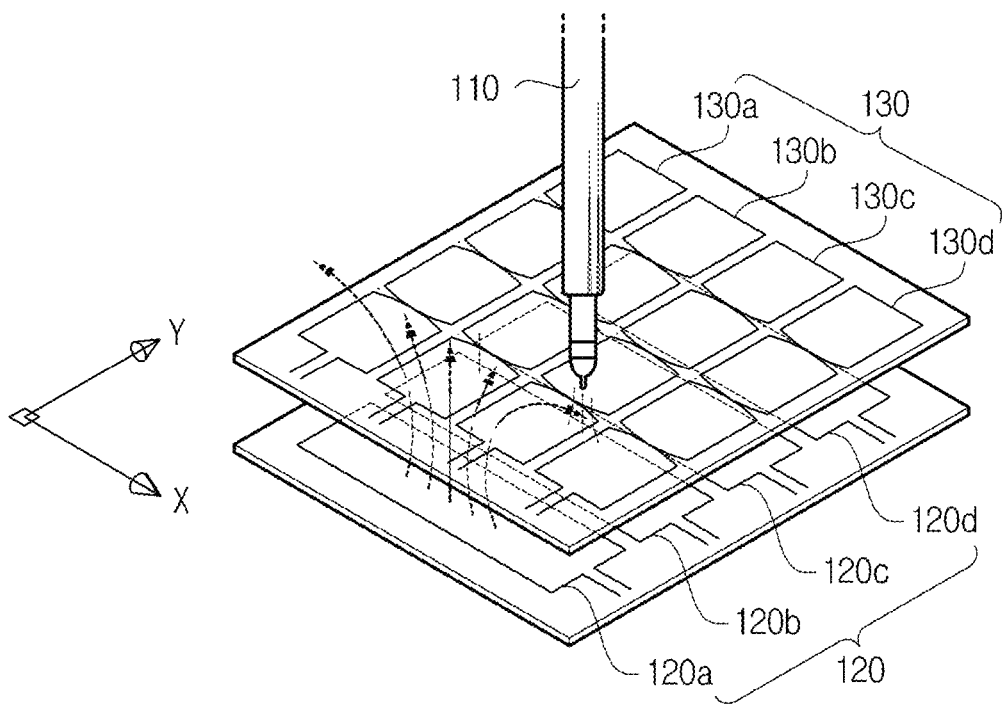

In detail, as shown in FIG. 8, current supplies to the first driving coil 120a to induce the magnetic line of force. Voltage is induced to the four sensing coils 130 by the magnetic line of force. The control unit measures four induced voltages in an order of first sensing coil 130a→second sensing coil 130b→third sensing coil 130c→fourth sensing coil 130d. In this case, the input unit 110 is disposed over the second driving coil 120b and is thus spaced apart from the first driving coil 120a, such that the variation of voltage induced to the four sensing coils 130 is not large. As a result, the control unit compares the variation of voltage induced to the four sensing coils 130 with the foregoing first reference value to determine that the variation of voltage is a predetermined value or less, thereby recognizing that the input unit 100 is not present over the first driving coil 120a.

Next, current is supplied to the second driving coil 120b to induce the magnetic line of force. Voltage is induced to the four sensing coils 130 by the magnetic line of force. The control unit measures four induced voltages in an order of first sensing coil 130a→second sensing coil 130b→third sensing coil 130c→fourth sensing coil 130d. In this case, the input unit 110 is disposed over a point at which the second driving coil 120b intersects the third sensing coil 130c and therefore, the variation of voltage induced to the third sensing coil 130c among the four sensing coils 130 is the largest. The control unit compares the variation of voltage induced to the third sensing coil 130c with the foregoing second reference value to determine that the variation of voltage is a predetermined value or more, thereby recognizing that the input unit 110 is disposed over a point at which the second driving coil 120b and the third sensing coil 130c intersect each other. In this case, the second driving coil 120b is secondly disposed in the second axis direction (Y-axis direction) and the third sensing coil 130c is thirdly disposed in the first axis direction (Y-axis direction) and therefore, the control unit can finally calculate the coordinates of the input unit 110 based on the positional information.

Next, the control unit may perform the process of supplying current to the third driving coil 120c to induce the magnetic line of force and the process of supplying current to the fourth driving coil 120d to induce the magnetic line of force. However, the processes are similar to a process of supplying current to the first driving coil 120a to induce the magnetic line of force and therefore, the description thereof will be omitted.

Meanwhile, the drawings about the preferred embodiments of the present invention show that the driving coil 120 is disposed at the lower portion and the sensing coil 130 is disposed at the upper portion, but the scope of the present invention is not limited thereto. Various embodiments, such as the case in which the driving coil 120 is disposed at the upper portion and the sensing coil 130 is disposed at the lower portion, and the like, may be present.

According to the preferred embodiments of the present invention, the current induced to the sensing coil due to the influence of the magnetic line of force flows in one direction over the length of the coil, such that the phenomenon in that the induced current is offset over the length of the sensing coil does not occur.

Therefore, when the constant AC voltage is applied to the driving coil, the ratio of the voltage induced to the sensing coil is increased, such that the operation efficiency of the digitizer and the precision of location detection of the input unit can be greatly improved.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A digitizer, comprising:
a driving coil supplied with current to induce a magnetic line of force;
a sensing coil disposed so as to intersect the driving coil to flow induced current in one direction by the magnetic line of force; and
a control unit sensing variation of voltage induced to the sensing coil to calculate coordinates of an input unit when the voltage is changed due to an approach of the input unit,
wherein:
the sensing coil includes a first line disposed in one direction within an area facing an inner area of the driving coil, a second line spaced apart from the first line so as to be disposed in the other direction within the area facing the inner area of the driving coil, a third line disposed in one direction within an area facing an outer area of the driving coil, and a fourth line spaced apart from the third line so as to be disposed in the other direction within an area facing an outer area of the driving coil,
the first line and the third line are connected to each other by a first connection line and the second line and the fourth line is connected by a second connection line, and
a direction of magnetic force line of the area facing the inner region of the driving coil is contrary to a direction of magnetic force line of the area facing the outer region of the driving coil.

2. The digitizer as set forth in claim 1, wherein the first connection line and the second connection line intersect each other and are insulated from each other by an insulating part interposed therebetween.

3. The digitizer as set forth in claim 1, wherein current supplied to the driving coil by the control unit is alternating current.

4. The digitizer as set forth in claim 1, wherein the driving coil and the sensing coil perpendicularly intersect each other.

5. The digitizer as set forth in claim 1, wherein the driving coil is disposed in plural so as to be parallel with each other based on a first axis direction, and the sensing coil is disposed in plural so as to be parallel with each other based on a second axis direction perpendicular to the first axis direction.

6. The digitizer as set forth in claim 5, wherein the control unit sequentially supplies current to the plurality of driving coils along the second axis direction and sequentially induces the magnetic line of force to the plurality of driving coils along the second axis direction.

7. The digitizer as set forth in claim 5, wherein the control unit measures the voltage sequentially induced to the plurality of sensing coils along the first axis direction.

8. The digitizer as set forth in claim 5, wherein the control unit sets the voltage induced to the sensing coil as a reference value before the voltage induced to the sensing coil is changed by the input unit, and when the voltage induced to the sensing coil is changed by the input unit, compares the voltage with the reference value to sense the variation of voltage induced to the sensing coil.

9. The digitizer as set forth in claim 1, further comprising: an insulating layer interposed between the driving coil and the sensing coil so as to insulate the driving coil and the sensing coil from each other.

* * * * *